United States Patent
Mastro

(12) 
(10) Patent No.: US 6,209,926 B1
(45) Date of Patent: Apr. 3, 2001

(54) PIPE COUPLER

(76) Inventor: Ronald J. Mastro, 965 Prospect St., No. 405, Honolulu, HI (US) 96822

( * ) Notice: Subject to any disclaimer, the term of this patent is extended or adjusted under 35 U.S.C. 154(b) by 0 days.

(21) Appl. No.: 09/293,049

(22) Filed: Apr. 16, 1999

(51) Int. Cl.[7] .................................................. F16L 15/02
(52) U.S. Cl. ........................................ 285/32; 285/148.19
(58) Field of Search ........................... 285/333, 148.19, 285/FOR 157, 32, 334.4

(56) References Cited

U.S. PATENT DOCUMENTS

| | | | | |
|---|---|---|---|---|
| 176,796 | * | 5/1876 | Martin | 285/148.19 |
| 349,146 | * | 9/1886 | Duff | 285/148.19 |
| 861,828 | * | 7/1907 | Grindrod | 285/148.19 |
| 1,270,021 | * | 6/1918 | Delehanty | 285/32 |
| 1,325,147 | * | 12/1919 | Donnelly | 285/148.19 |
| 1,365,025 | * | 1/1921 | Elder | 285/32 |
| 1,781,091 | * | 11/1930 | Wilson | 285/148.19 |
| 2,107,716 | * | 2/1938 | Singleton | 285/148.19 |
| 2,702,715 | * | 2/1955 | Andrews | 285/32 |
| 2,906,152 | * | 9/1959 | Brase | 285/148.19 |

\* cited by examiner

*Primary Examiner*—Eric K. Nicholson
(74) *Attorney, Agent, or Firm*—Mark D. Miller

(57) ABSTRACT

Disclosed is a small space-saving two-part coupling system for attaching threaded pipes which is particularly suited for use in replacing broken valves, pipes or parts in existing plumbing systems where little space is available. The invention includes a pair of nuts with male extensions located thereon, each nut having a helically threaded axial bore therethrough, and exterior helical threads on the male extension. The bore of the first nut has R.H. threads, and the male extension of the first nut has L.H. threads. The bore of the second nut has L.H. threads, and the male extension of the second nut has R.H. threads. The nuts are designed to be coupled to each other using the L.H. threads, and coupled to an existing pipe system using the R.H. threads.

15 Claims, 5 Drawing Sheets

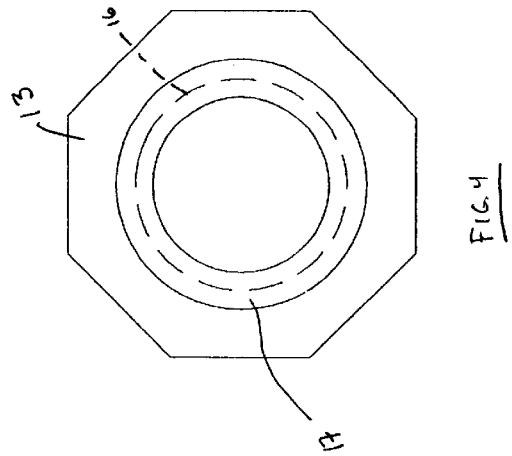
FIG. 4
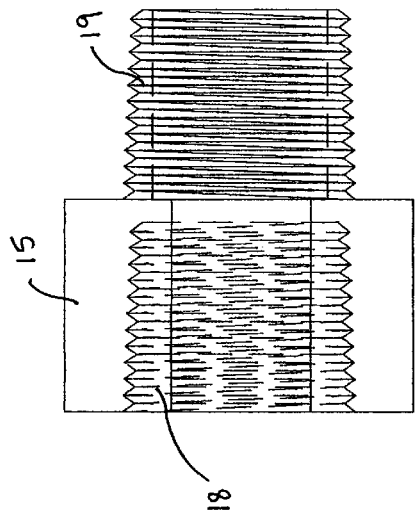
FIG. 2
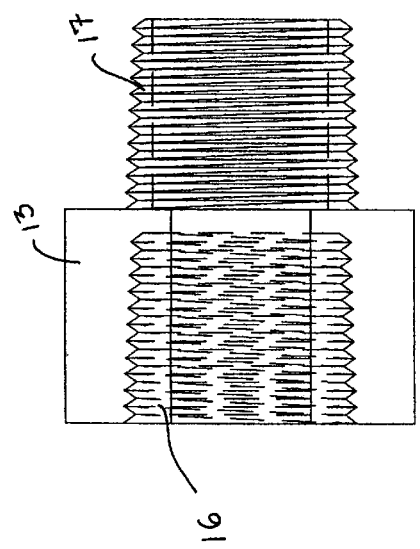
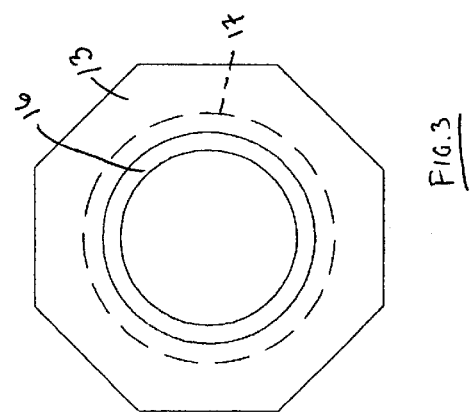
FIG. 3

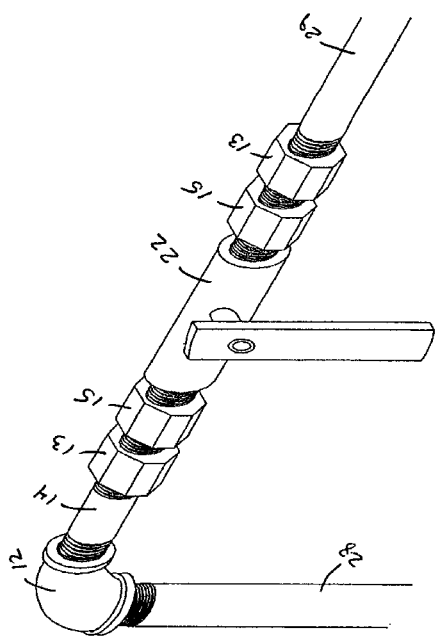
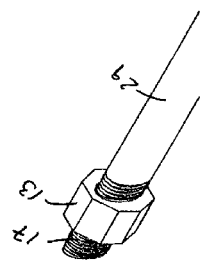
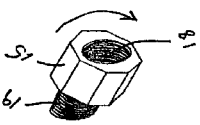
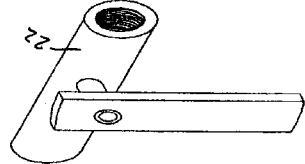
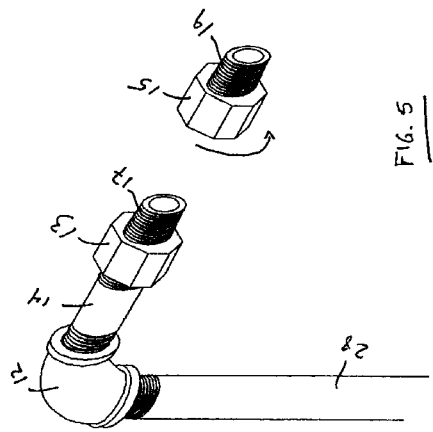

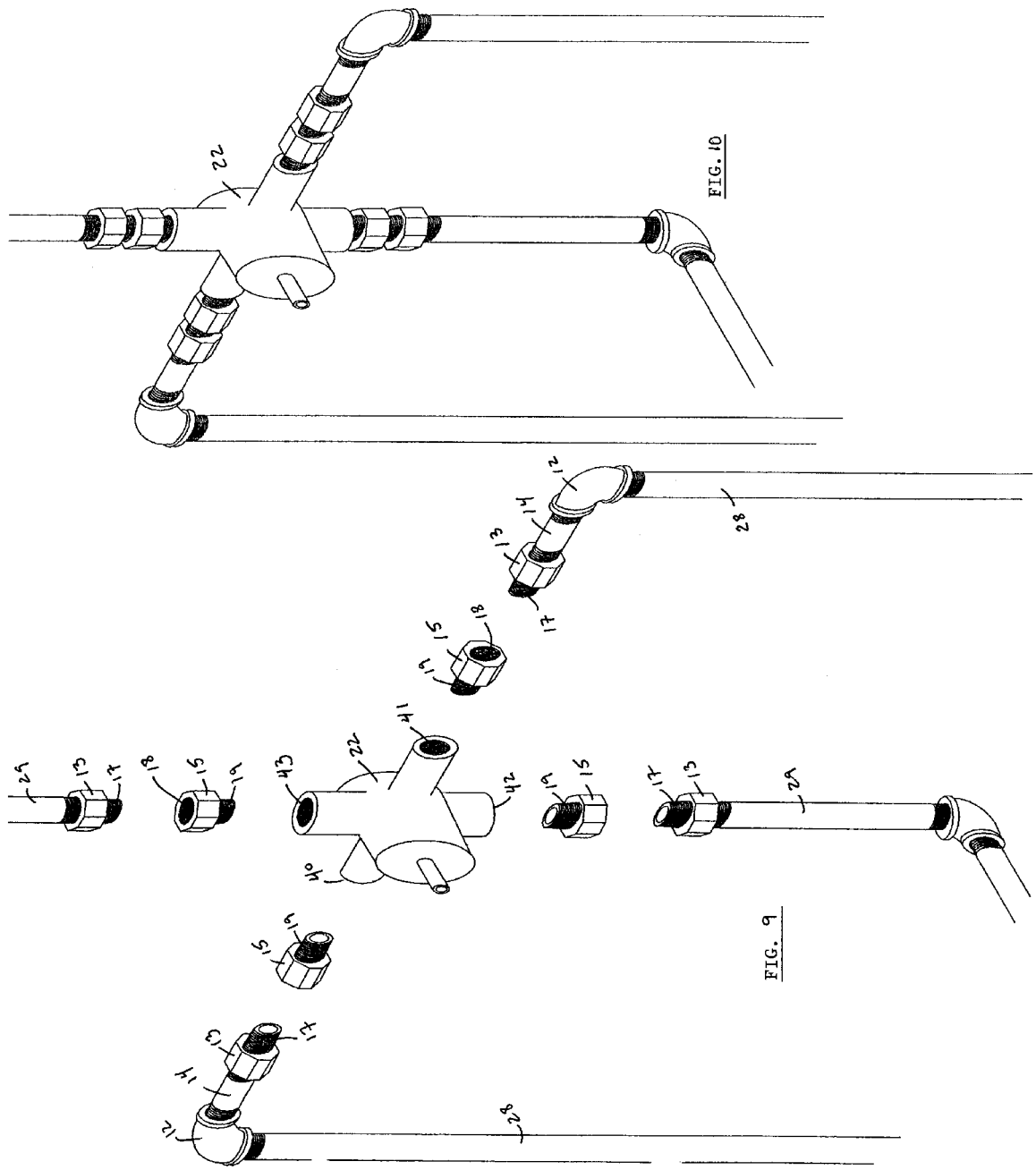

PIPE COUPLER

BACKGROUND OF THE INVENTION

The present invention relates to pipe connectors, and more particularly to a new and improved coupler for connecting water, gas or electrical pipes.

FIELD OF THE INVENTION

In the field of water plumbing systems, valves are typically attached to plastic, polyvinylchloride (PVC) or metal source pipes using threaded pipe segments which fit into one another. Installation of pipes and plumbing systems ordinarily occurs as part of new construction. Ordinarily, all of the connections of the pipes have right-handed threads (e.g. clockwise rotation to connect; counter-clockwise to disconnect). Once such systems are installed, they are typically incorporated into or behind floors, ceilings, walls, tile or the like. Similarly, irrigation valve systems are typically installed in trenches and then buried. Accordingly, the positions of the pipes and valves are established at installation.

In the event of a later pipe or valve failure, a first problem is presented in gaining access to the pipe or valve that may now be behind a wall or buried underground. This may involve tearing out some or all of a wall, floor or ceiling to get to the broken pipe or valve. Since the positions of the pipes and valves in the system have been long established, care must be taken not to dislodge these pipes. At the same time, a sufficient opening must be created to reach not only the malfunctioning part but also the pipe pieces connected to it.

A second problem is presented in removing the broken pipe, valve or part. Ordinarily, the pipe(s) leading to the broken part are cut and the part is removed along with the pipe segments attached to it (i.e. between the cut(s) and the broken part). At this point, the remaining cut pipe segments must be removed from the pipe system. For each pipe segment, this usually involves ascertaining the location of the nearest threaded joint and unscrewing the pipe segment from the joint.

The third and most difficult problem is now presented: replacing the broken part and attaching it to the fixed positions of the pipes in the existing system. In a typical plumbing system for a bathtub or shower, the broken valve is attached not only to two separate water sources (hot and cold) but also to at least one output (the shower) if not two (the shower and the tub). Thus, as many as four different pipes can be connected to a single valve in a fixed position in a wall. In many cases, these connections are very tight, using very short pipes which are attached immediately to ninety degree elbow joints. The elbow joints, in turn, are usually connected to much longer pipes which lead far back into the wall. Generally, all of the connections made at the time of installation use pipes, elbow joints and couplers having right-handed threads.

It is preferred to remove as little of the existing piping as possible in order to replace the broken part. The more pipe which must be removed, the larger the opening required, and the more destruction and replacement that must be made to the wall, ceiling or floor. In some cases it may be impractical or impossible to remove much of the existing piping because of access, corrosion of pipe pieces, or other factors.

Most existing pipe coupling devices for use in replacing broken pipes, valves or other parts have three-parts. One of these parts is a first pipe which has identically directioned right-handed (R.H.) helical threads at both ends thereof. These R.H. threads match those of a typical plumbing system such that either end may be inserted into a threaded R.H. bore in the system with clockwise rotation. The next part is an unusual second pipe which has oppositely directioned helical threads at either end thereof. One end has R.H. threads which correspond to the threads in a typical plumbing system, but the other end has left-handed (L.H.) threads. These threads correspond to a L.H. bore at one end of a turnbuckle, which is the third part of this typical coupling system. The turnbuckle also has a R.H. bore at the opposite end, and is designed to be placed between the two aforementioned parts.

In use, all three of these parts must be attached together and also attached between the new valve and the existing plumbing system, with adjustment being made by turning the central turnbuckle. Usually these three parts (the first pipe, the second pipe and the turnbuckle) require far too much space than that available in the plumbing system. In particular, a typical length for each of the two pipes is four inches (4"), and the turnbuckle is an inch and one half (1½") in length for a total of over nine inches (9"). Even if very short pipes could be found, they would need to be at least two inches (2") in length to have sufficient usable threading, which when combined with the turnbuckle would still have a total length of over five inches (5"). Because of the space required to use these 3-part couplers, in many cases a considerable amount of the existing plumbing must be removed and replaced (e.g. with a series of elbows and joints) to provide sufficient space to receive the 3-part couplers. This involves additional demolition, additional parts, and additional time and expense to accomplish the replacement.

It is therefore highly desirable to have a small, space efficient apparatus for coupling water, gas, electrical and other pipes together.

SUMMARY OF THE INVENTION

The present invention provides a small space-saving two-part coupling system for attaching threaded pipes which is particularly suited for use in replacing broken valves, pipes or parts in existing plumbing systems where little space is available. The invention includes a pair of nuts with male extensions located thereon, each nut having a helically threaded axial bore therethrough, and exterior helical threads on the male extension. The bore of the first nut has R.H. threads, and the male extension of the first nut has L.H. threads. The bore of the second nut has L.H. threads, and the male extension of the second nut has R.H. threads. The nuts are designed to be coupled to each other using the L.H. threads, and coupled to an existing pipe system using the R.H. threads.

The invention is most efficiently used when connecting between male and female ends of a pipe system. In such a case, the first nut having the R.H. bore is snugly attached to the male end of the system. The second nut is then fitted between the R.H. female opening in the system and the L.H. extension of the first nut. Rotating the second nut clockwise when facing the female opening causes its R.H. threads to thread into said opening, and also causes its L.H. opening to thread over the L.H. extension of the first nut, thereby joining the pipes together. Counterclockwise rotation of the second nut causes it to unthread from both of these attachments.

For use in attaching two female ends of an existing pipe system together, an extension or bridge pipe of an appropriate size (e.g. very short) having male R.H. threads at both ends is first snugly threaded into one of the female openings of the existing pipe system. The pipe system now has one male and one female end, and attachment of the two nuts of the present invention may now be accomplished as described above.

For use in attaching two male ends of an existing pipe system together, an extension or bridge pipe of an appropriate size (e.g. very short) having female R.H. threads at both ends is first snugly threaded over one of the male openings of the existing pipe system. The pipe system now has one male and one female end, and attachment of the two nuts of the present invention may now be accomplished as described in the male/female situation above.

For coupling widely separated ends of pipes in a system, an appropriately sized extension pipe having male and/or female R.H. threads at both ends may be used to bridge this gap.

The present invention may also be employed in new pipe installation. The invention may easily be used to couple valves, short pipe segments, and other parts together in new pipe systems. Not only does the present invention accomplish the task of coupling pipes with a minimum of space, should future repair or replacement of a valve or part become necessary, if the present invention was used in the original pipe system, it is an easy matter to remove and replace any adjacent part of the system. The present invention may be particularly useful in situations involving broken valves which cannot themselves be spun because of their position or placement in a wall. In anticipation of a possible future failure of such a valve, the valve may be originally attached to the pipe system using the coupler of the present invention. Then, should replacement become necessary, spinning the nuts of the present invention is all that is required for removal of the valve.

It is therefore a primary object of the present invention to provide a coupler for use in threaded pipe systems which may be used to connect newly installed or replacement pipes using a minimum amount of space.

It is a further important object of the present invention to provide a small two-part coupler for use in connecting threaded pipes together.

It is a further important object of the present invention to provide a space saving two-part coupler for connecting threaded pipes together, the first part in the form of a nut having a R.H. helically threaded bore therein and an L.H. threaded extension thereon, the second part in the form of a nut having a L.H. helically threaded bore therein and an R.H. threaded extension thereon.

Other objects of the invention will be apparent from the detailed descriptions and the claims herein.

BRIEF DESCRIPTION OF THE DRAWINGS

FIG. 2 is a cutaway side view of the two nuts of the coupler of the present invention in an uncoupled condition.

FIG. 3 is back view of a nut of the present invention.

FIG. 4 is a front view of the nut of FIG. 3 the present invention.

FIG. 5 is an exploded perspective view of a typical inline valve showing how the coupler of the present invention could be utilized.

FIG. 6 is a perspective view of the in-line valve of FIG. 6 showing utilization of the coupler of the present invention.

FIG. 9 is an exploded perspective view of a typical 4-part (tub and shower) valve showing how the coupler of the present invention could be utilized.

FIG. 10 is a perspective view of the 4-part valve of FIG. 9 showing utilization of the coupler of the present invention.

DETAILED DESCRIPTION OF THE PREFERRED EMBODIMENTS

Figure 1:
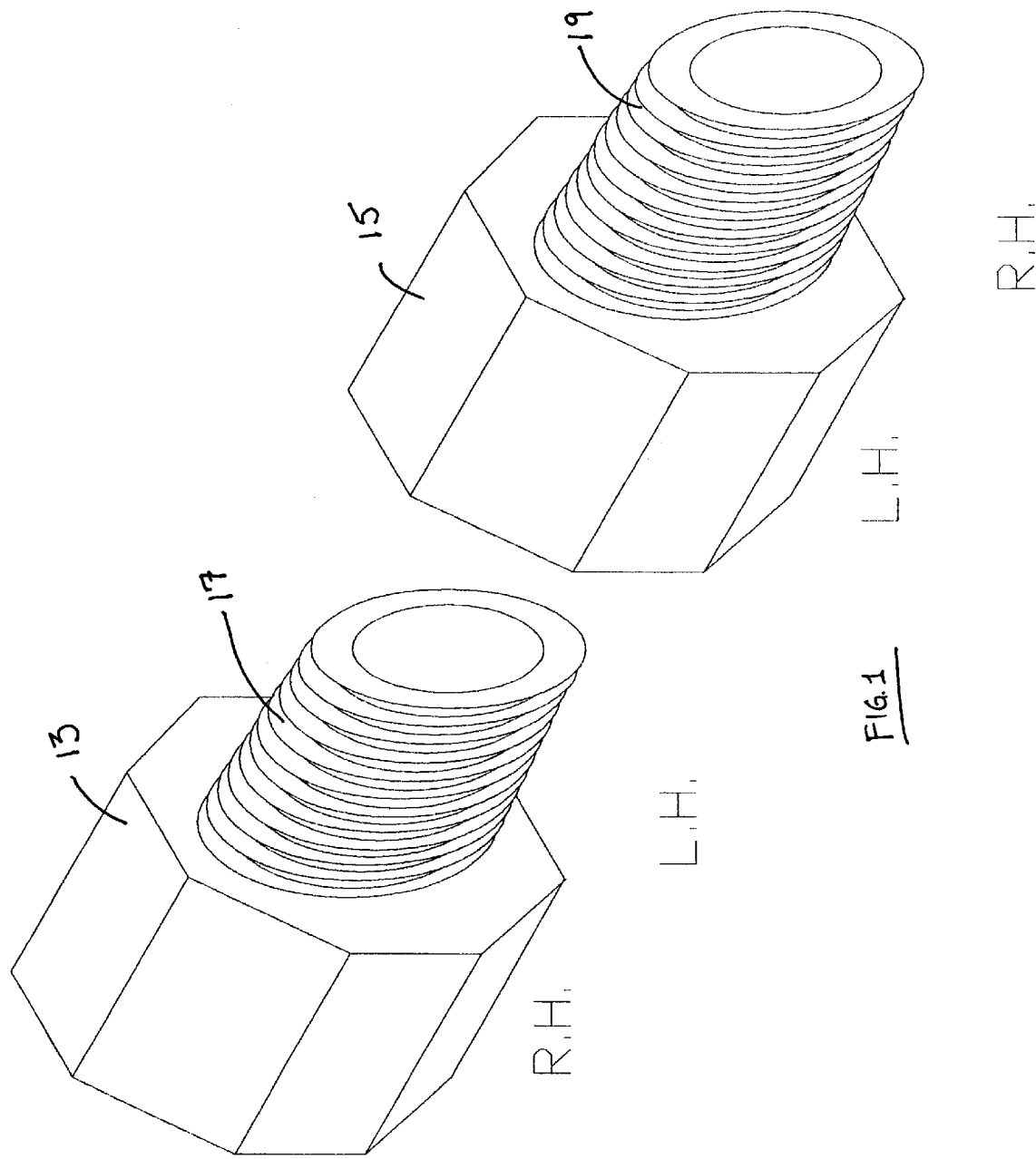
FIG. 1 is a perspective view of the two nuts of the coupler of the present invention in an uncoupled condition.

Referring to the drawings wherein like reference characters designate like or corresponding parts throughout the several views, and referring particularly to FIGS. 1–4, it is seen that the invention includes a first nut 13 and a second nut 15. Each nut 13 and 15 has a male extension located thereon, and each such extension has exterior helical threads. Each nut 13 and 15 also has a helically threaded axial bore therethrough. The bore 16 of the first nut 13 has right-hand (R.H.) helical threads, and the male extension 17 of the first nut 13 has L.H. threads. (See FIGS. 1 and 2.) The bore 18 of the second 15 nut has left-hand (L.H.) helical threads, and the male extension 19 of the second nut has R.H. threads. Nuts 13 and 15 are designed to be coupled to each other using the L.H. threads of extension 17 and bore 18. The R.H. threads of bore 16 and extension 19 are designed to be coupled to the R.H. threads of an existing pipe system.

Figure 8:
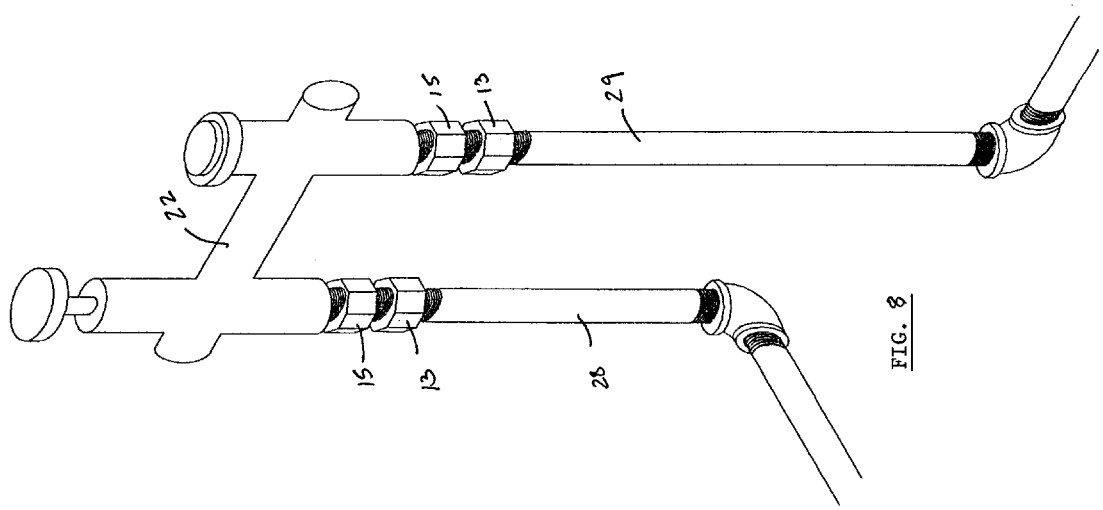
FIG. 8 is a perspective view of the irrigation sprinkler valve of FIG. 7 showing utilization of the coupler of the present invention.
Figure 7:
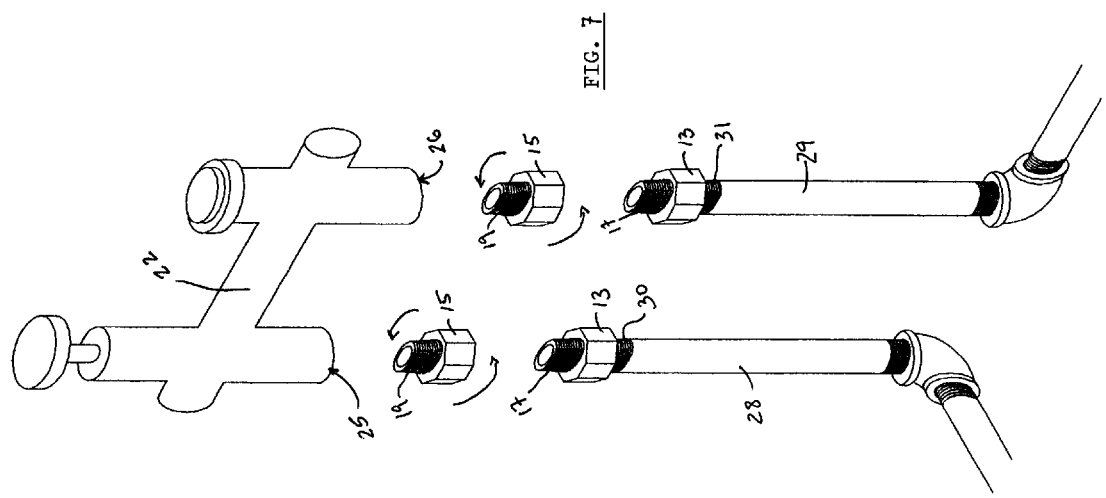
FIG. 7 is an exploded perspective view of a typical irrigation sprinkler valve showing how the coupler of the present invention could be utilized.

FIGS. 7 and 8 illustrate use of the dual nuts of the present invention to couple an irrigation valve 22 to a pipe system. Referring to FIG. 7, it is seen that valve 22 includes a R.H. threaded input bore 25 and an R.H. threaded output bore 26. Input bore 25 is to be coupled to input line 28, and output bore 26 is to be coupled to output line 29. However, if input bore 25 were to be screwed directly onto the male R.H. threads 30 at the end of input line 28, the position of the valve 22 would then be fixed making it impossible to screw output bore 26 onto the male R.H. threads 31 of output line 29.

The present invention makes it possible to couple both connections required in FIGS. 7 and 8. Bore 16 of nut 13 of the present invention is tightly screwed over the R.H. threads 30 of input pipe 28. Similarly, bore 16 of another nut 13 is tightly screwed over the R.H. threads 31 of output pipe 29. Nuts 15 are then placed over the L.H. threads 17 of nuts 13, and the R.H. bores 25 and 26 of valve 22 are placed over the R.H. threads 19 of nuts 15. Counter-clockwise rotation of nuts 15 causes their R.H. threads 19 to screw into bores 25 and 26; this same rotation also causes their L.H. bores 18 to screw over threads 17 of nuts 13. The completed assembly is shown in FIG. 8. Nuts 15 can be easily uncoupled using clockwise rotation in order to remove or replace the valve 22.

FIGS. 5 and 6 illustrate the attachment of an in-line valve to a pipe system. Valve 22 has female R.H. threads at either end. A female/female R.H. elbow 12 is provided on input line 28, and male/male R.H. extension 14 is coupled into elbow 12. Output line 29 has a male end, so no extension is required.

The R.H. bore 16 of nut 13 is threaded over extension 14, and the R.H. bore 16 of another nut 13 is threaded over the male end of line 29. Nut 15 is then placed between the L.H. extension 17 of nut 13 and the R.H. input bore of valve 22.

Rotating nut 15 in a counter-clockwise direction will cause extension 19 to thread into the input bore of valve 22, and will also cause L.H. bore 18 to thread over extension 17. Another nut 15 is placed between nut 13 on line 29 and the output bore of valve 22. Clockwise rotation of this nut 15 will cause extension 19 to thread into the output bore of valve 22, and will also cause L.H. bore 18 to thread over extension 17. The completed assembly is shown in FIG. 6. Nuts 15 can be easily uncoupled using opposite rotation in order to remove or replace the valve 22.

FIGS. 9 and 10 illustrate the attachment of dual input lines to a dual output valve 22. This is the type of valve that can be particularly difficult to access for replacement since it is attached to the pipe system at four different places. Valve 22 has female R.H. threads at its left 40 and right 41 inputs, and at its upper 43 and lower 42 outputs. A female/female R.H. elbow 12 is provided on each input line 28, and a male/male R.H. extension 14 is coupled into each elbow 12. Each of output lines 29 have male ends, so no extensions are required.

On the input lines 28, the R.H. bore 16 of each nut 13 is threaded over extension 14. On the output lines 29, the R.H. bore 16 of each nut 13 is threaded over the male end of line 29. Nuts 15 are then placed between the L.H. extensions 17 of nuts 13 and the R.H. bores (40–43) of valve 22. Rotating nuts 15 will cause extensions 19 to thread into the bores (40–43) of valve 22, and will also cause the L.H. bores 18 of nuts 15 to thread over extensions 17 of nuts 13. The completed assembly is shown in FIG. 10. Nuts 15 can be easily uncoupled using opposite rotation in order to remove or replace the valve 22.

It is to be understood that variations and modifications of the present invention may be made without departing from the scope thereof. It is also to be understood that the present invention is not to be limited by the specific embodiments disclosed herein, but only in accordance with the appended claims when read in light of the foregoing specification.

I claim:

1. A system for coupling the ends of a pair of axially aligned threaded pipes having fixed positions, the first of said pipes having an R.H. threaded male extension, the second of said pipes having an R.H. threaded bore, said system comprising a pair of nuts having male extensions located thereon, helically threaded axial bores therethrough, and exterior helical threads on said male extensions, the bore of the first nut having R.H. threads for threadable engagement over the R.H. threads of the first pipe, the male extension of the first nut having L.H. threads, the bore of the second nut having L.H. threads, and the male extension of the second nut having R.H. threads for threadable engagement into the R.H. bore of the second pipe.

2. The coupler of claim 1 wherein said first pipe has an R.H. threaded bore, and a bridge pipe having male R.H. threads at both ends is provided, one end of said bridge pipe for threadable engagement into the R.H. bore of said first nut, the other end of said bridge pipe for threadable engagement into the R.H. bore of said first pipe.

3. The coupler of claim 1 wherein said second pipe has an R.H. threaded extension, and a bridge pipe having female R.H. threads at both ends is provided, one end of said bridge pipe for threadable engagement over the R.H. extension of said second nut, the other end of said bridge pipe for threadable engagement over the R.H. extension of said second pipe.

4. In combination, a pair of axially aligned threaded pipes and a coupling system comprising:
   a. a first pipe in a fixed position having R.H. exterior threads at one end thereof;
   b. a second pipe in a fixed position axially aligned with said first pipe. said second pipe having an R.H. threaded bore at one end thereof, said bore facing the threaded end of said first pipe;
   c. a first nut having a male extension thereon and an axial bore therethrough, said axial bore having R.H. threads for threadable engagement over the R.H. threads of said first pipe, and said male extension having L.H. threads; and
   d. a second nut having a male extension thereon and an axial bore therethrough, said axial bore having L.H. threads for threadable engagement over the male extension of said first nut, and the male extension of said second nut having R.H. helical threads for threadable engagement into the R.H. bore of said second pipe.

5. The combination of claim 4 wherein the end of said first pipe has an R.H. threaded bore, and an extension pipe having male R.H. threads at both ends is provided, one end of said extension pipe for threadable engagement with the R.H. bore of said first nut, the other end of said extension pipe for threadable engagement with the R.H. bore of said first pipe.

6. The combination of claim 4 wherein the end of said second pipe has an R.H. threaded extension, and an extension pipe having female R.H. threads at both ends is provided, one end of said extension pipe for threadable engagement with the R.H. extension of said second nut, the other end of said extension pipe for threadable engagement with the R.H. extension of said second pipe.

7. A coupling system for attaching a valve to a pair of fixed position threaded pipes comprising:
   a. a valve apparatus having first and second outwardly facing parallel openings on one side of said apparatus, each of said openings having an R.H. threaded bore therein;
   b. a first pipe in a fixed position having R.H. exterior threads at one end thereof;
   c. a second pipe in a fixed position aligned in parallel with said first pipe, said second pipe having R.H. exterior threads at one end thereof,
   d. a first nut having a male extension thereon and an axial bore therethrough, said axial bore having R.H. threads for threadable engagement over the R.H. threads of said first pipe, said male extension having L.H. threads;
   e. a second nut having a male extension thereon and an axial bore therethrough, said axial bore having L.H. threads for threadable engagement over the male extension of said first nut, the male extension of said second nut having R.H. threads for threadable engagement into the R.H. bore of said first valve opening;
   f. a third nut having a male extension thereon and an axial bore therethrough, said axial bore having R.H. threads for threadable engagement over the R.H. threads of said second pipe, said male extension having L.H. threads; and
   g. a fourth nut having a male extension thereon and an axial bore therethrough, said axial bore having L.H. threads for threadable engagement over the male extension of said third nut, the male extension of said fourth nut having R.H. threads for threadable engagement into the R.H. bore of said second valve opening.

8. A coupling system for attaching a 3-part water control valve to a set of fixed position threaded pipes comprising:
   a. a valve apparatus having a pair of generally parallel ends, and two parallel sides perpendicular to said ends, said apparatus including a first outwardly facing opening on one of said sides, a second outwardly facing opening on the opposite side, and a third opening on one of said ends, each of said openings having an R.H. threaded bore therein;

b. a first pipe in a fixed position having R.H. exterior threads at one end thereof;

c. a second pipe in a fixed position aligned across from said first pipe, said second pipe having R.H. exterior threads at the end of said second pipe facing said first pipe;

d. a third pipe in a fixed position aligned perpendicular to and between said first and second pipes, said third pipe having R.H. exterior threads at one end thereof;

e. three first nuts, each such nut having a male extension thereon and an axial bore therethrough, each such axial bore having R.H. threads for threadable engagement over the R.H. threads of one of said three pipes, each such male extension having L.H. threads; and f. three second nuts, each such second nut having a male extension thereon and an axial bore therethrough, each such axial bore having L.H. threads for threadable engagement over the male extensions of said first nuts, the male extensions of said second nuts having R.H. threads for threadable engagement into the R.H. bores of one of said three valve openings.

9. The coupling system of claim 8 wherein at least one of said first and second pipes has an R.H. threaded bore, and a bridge pipe is provided having male R.H. threads at both ends, one end of said bridge pipe for threadable engagement into the R.H. bore of one of said first nuts, the other end of said bridge pipe for threadable engagement into the R.H. bore of said at least one pipe.

10. The coupling system of claim 8 wherein said third pipe has an R.H. threaded bore, and a bridge pipe is provided having male R.H. threads at both ends, one end of said bridge pipe for threadable engagement into the R.H. bore of one of said first nuts, the other end of said bridge pipe for threadable engagement into the R.H. bore of said third pipe.

11. The coupling system of claim 9 wherein said third pipe has an R.H. threaded bore, and a bridge pipe is provided having male R.H. threads at both ends, one end of said bridge pipe for threadable engagement into the R.H. bore of one of said first nuts, the other end of said bridge pipe for threadable engagement into the R.H. bore of said third pipe.

12. A coupling system for attaching a 4-part water control valve to a set of fixed position threaded pipes comprising:

a. a valve apparatus having a pair of generally parallel ends, and two parallel sides perpendicular to said ends, said apparatus including a first outwardly facing opening on one of said sides, a second outwardly facing opening on the opposite side, and a third opening on one of said ends, and a fourth outwardly facing opening on the opposite end, each of said openings having an R.H. threaded bore therein;

b. a first pipe in a fixed position having R.H. exterior threads at one end thereof;

c. a second pipe in a fixed position aligned across from said first pipe, said second pipe having R.H. exterior threads at the end of said second pipe facing said first pipe;

d. a third pipe in a fixed position aligned perpendicular to and between said first and second pipes, said third pipe having R.H. exterior threads at one end thereof;

e. a fourth pipe in a fixed position aligned across from said third pipe, said fourth pipe having R.H. exterior threads at the end of said fourth pipe facing said third pipe;

f. four first nuts, each such nut having a male extension thereon and an axial bore therethrough, each such axial bore having R.H. threads for threadable engagement over the R.H. threads of one of said four pipes, each such male extension having L.H. threads; and g. four second nuts, each such second nut having a male extension thereon and an axial bore therethrough, each such axial bore having L.H. threads for threadable engagement over the male extensions of said first nuts, the male extensions of said second nuts having R.H. threads for threadable engagement into the R.H. bores of one of said four valve openings.

13. The coupling system of claim 12 wherein at least one of said first and second pipes has an R.H. threaded bore, and a bridge pipe is provided having male R.H. threads at both ends, one end of said bridge pipe for threadable engagement into the R.H. bore of one of said first nuts, the other end of said bridge pipe for threadable engagement into the R.H. bore of said at least one pipe.

14. The coupling system of claim 12 wherein at least one of said third and fourth pipes has an R.H. threaded bore, and a bridge pipe is provided having male R.H. threads at both ends, one end of said bridge pipe for threadable engagement into the R.H. bore of one of said first nuts, the other end of said bridge pipe for threadable engagement into the R.H. bore of said at least one pipe.

15. The coupling system of claim 13 wherein at least one of said third and fourth pipes has an R.H. threaded bore, and a bridge pipe is provided having male R.H. threads at both ends, one end of said bridge pipe for threadable engagement into the R.H. bore of one of said first nuts, the other end of said bridge pipe for threadable engagement into the R.H. bore of said at least one pipe.

* * * * *